United States Patent
Chepa et al.

(10) Patent No.: US 9,852,139 B1
(45) Date of Patent: Dec. 26, 2017

(54) DIRECTORY PARTITIONING WITH CONCURRENT DIRECTORY ACCESS

(75) Inventors: Sudheer Keshav Chepa, Andhra Pradesh (IN); Anindya Banerjee, Barrackpore (IN); Upendra Pratap Singh, Uttar Pradesh (IN)

(73) Assignee: Veritas Technologies LLC, Mountain View, CA (US)

( * ) Notice: Subject to any disclaimer, the term of this patent is extended or adjusted under 35 U.S.C. 154(b) by 940 days.

(21) Appl. No.: 13/539,676

(22) Filed: Jul. 2, 2012

(51) Int. Cl.
*G06F 17/30* (2006.01)
*H04L 29/08* (2006.01)

(52) U.S. Cl.
CPC .... *G06F 17/30091* (2013.01); *G06F 17/3007* (2013.01); *G06F 17/30079* (2013.01); *H04L 67/1095* (2013.01)

(58) Field of Classification Search
CPC ........... G06F 17/30091; G06F 17/3007; G06F 17/30079; H04L 67/1095
See application file for complete search history.

(56) References Cited

U.S. PATENT DOCUMENTS

| | | | |
|---|---|---|---|
| 6,253,300 B1* | 6/2001 | Lawrence et al. | 711/173 |
| 7,509,310 B1* | 3/2009 | Joshi | H04L 29/12132 |
| 2005/0234867 A1* | 10/2005 | Shinkai | 707/1 |
| 2007/0079099 A1* | 4/2007 | Eguchi | 711/170 |
| 2009/0157777 A1* | 6/2009 | Golwalkar et al. | 707/205 |
| 2009/0164468 A1* | 6/2009 | Cornwell | G06F 17/30362 |
| 2009/0182855 A1* | 7/2009 | Golwalkar et al. | 709/223 |
| 2010/0010961 A1* | 1/2010 | Golwalkar et al. | 707/2 |

\* cited by examiner

*Primary Examiner* — Jensen Hu
(74) *Attorney, Agent, or Firm* — Campbell Stephenson LLP

(57) ABSTRACT

Various systems and methods for partitioning a directory while allowing concurrent access to the directory. For example, a method involves receiving a request to partition an original directory that comprises a plurality of entries and creating a partitioned directory in response to receiving the request. The method also involves distributing the entries from the original directory to the partitioned directory. Distributing the entries involves sequentially copying each entry from the original directory to the partitioned directory. The method also involves performing an operation on the original directory while the entries are being distributed. Performing the operation involves accessing and/or updating the original directory.

25 Claims, 9 Drawing Sheets

DIRECTORY PARTITIONING WITH CONCURRENT DIRECTORY ACCESS

FIELD OF THE INVENTION

This invention relates to computer data storage and, more particularly, to partitioning directories.

DESCRIPTION OF THE RELATED ART

File systems are a means to organize user data into a data structure, which is also referred to as a file system. File systems also manage access to the user data within that data structure and manage available space on one or more storage devices that contain the user data. In particular, a file system can manage access to user data that has been organized into individual files. If a hierarchical organization of user data is desired, the file system can provide special files, called directories, that can each "contain" (e.g., provide contents that point to or otherwise identify) multiple files and/or subdirectories. File systems are often closely coupled to an operating system, or may be included in an operating system.

As the number and/or size of files in a directory increases, the amount of time taken to perform operations on the directory also increases. This performance degradation is a result of the fact that the directory represents a single point of access, and multiple entities may wish to simultaneously update or access the directory. File systems permit multiple types of operations, including update operations and access operations. For example, when one entity, e.g., a software thread, requests an update operation in a directory (e.g., requests to create a new file or subdirectory, delete an existing file or subdirectory, and the like), the file system typically grants the thread an exclusive lock on the directory. The update operation results in directory metadata being updated, and allowing multiple threads to update the directory metadata at the same time could lead to errors. The exclusive lock prevents any thread but the thread that has been granted the exclusive lock from updating or accessing the directory. The exclusive lock prevents any other threads from obtaining a lock, either shared or exclusive, while the exclusive lock is held. Similarly when one entity requests an access operation in a directory (e.g., listing contents of the directory, searching for an entry in the directory, and the like), the file system typically grants the thread a shared lock on the directory. The shared lock allows other threads to also obtain shared locks and perform access operations, but prevents any thread from obtaining an exclusive lock.

If, while the directory is exclusively locked to allow an update by the first thread, a second thread requests an update or access to the directory, the file system adds the second thread's request to a queue of pending requests. Once the first thread completes its ongoing update, the file system (or the first thread) releases the exclusive lock granted to the first thread and the file system grants an exclusive or shared lock on the directory to the second thread. Once the second thread obtains lock on the directory, the second thread can update or access the directory. Restricting the number of threads that can concurrently update a given directory prevents data consistency errors and contention errors and also enables directory metadata to be accurately updated. However, doing so can create delays in processing update requests, e.g., when multiple threads wish to simultaneously update a single directory. Such delays can negatively impact performance, e.g., by slowing down one or more applications that use the directory.

One solution is to partition the directory in which the files are stored. That is, the file system can divide the directory into multiple directories and distribute the files in the directory among the multiple directories. This is known as partitioning the directory and typically has the effect of improving performance because the structure of the single directory is no longer a bottleneck. However, the process of partitioning the directory is resource intensive and can interrupt access to the directory temporarily during the partitioning, thus compounding performance degradation.

BRIEF DESCRIPTION OF THE DRAWINGS

The present invention may be better understood, and its numerous objects, features and advantages made apparent to those skilled in the art by referencing the accompanying drawings.

Figure 1:
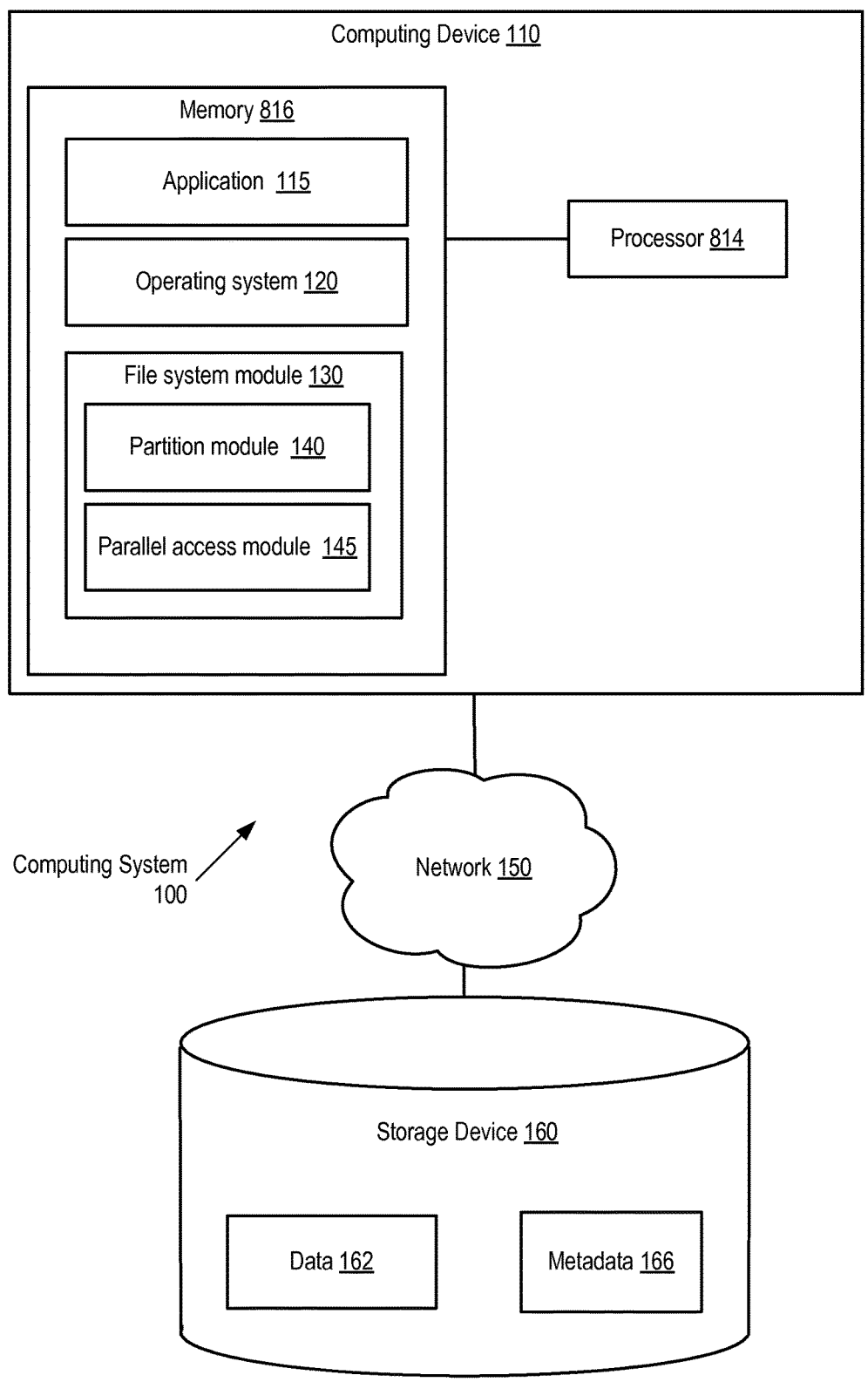
FIG. 1 is a block diagram of a system configured to partition a directory, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A file system typically includes a program e.g., a software module, configured to organize data and manage access to the data, as well as a data structure that includes information such as the size and number of files included in each of the directives and the locations of the data and metadata that make up the files. The file system monitors and updates information regarding files and directories included in the file system. The file system can automatically partition a directory in response to detecting the occurrence of some threshold condition. For example, the file system can partition the directory in response to detecting that the size of the directory has exceeded a pre-specified value.

In conventional file systems, partitioning a directory involves the file system, e.g., a particular module in the file system, taking an exclusive lock on the directory that is to be partitioned and holding the lock until the partitioning is complete. Taking an exclusive lock prevents entities other than the module, such as user applications, from updating or accessing (e.g., creating a new entry, deleting an entry, listing contents of the directory) the directory. Updating the directory typically involves modifying metadata associated with the directory, which can involve changing the structure of the directory, and/or locations of files in the directory. Updating a file, without performing an update that results in directory metadata being updated, can be performed, in some cases, without taking an exclusive lock. Accessing the directory typically involves reading the metadata associated with the directory. A read operation that does not access directory metadata, e.g., reading a file in the directory, can be performed, in some cases, without taking a shared lock. As will be appreciated, partitioning a directory in conventional systems involves significant performance degradation while the partitioning is ongoing. As long as the partition operation is ongoing, the directory is exclusively locked and is thus inaccessible to threads that may want to access the directory.

Partitioning a directory also involves creating a number of child directories (e.g., partitions, or sub-directories) and moving entries from the original directory into the child directories. These creating operations and moving operations are costly in terms of computing resources, such as processor cycles, memory space, and transmission bandwidth. The greater the amount of computing resources consumed, the longer the partitioning is likely to take. The longer the partitioning takes, the more severe the performance degradation and/or impact to entities that attempt to access the directory, since the entities are prevented from accessing or updating the directory until the partitioning is complete.

FIG. 1 is a block diagram of a computing system 100. Computing system 100 is configured to partition a directory and allow access to the directory while the partitioning is ongoing. For example, multiple user applications can access a directory while the directory is being partitioned. As shown, computing system 100 includes a computing device 110. Computing device 110 is a computing device such as a personal computer, laptop computer, server, personal digital assistant, cell phone, or the like. Computing device 110 is shown coupled to a storage device 160 by network 150. Network 150 can include a WAN (Wide Area Network), such as the Internet, one or more LANs (Local Area Networks), and/or one or more SANs (Storage Area Networks).

Storage device 160 provides persistent data storage, such that data stored on such a storage device is maintained even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Computing device 110 includes at least one processor 814 and a memory 816. Memory 816 stores program instructions executable by processor 814 to implement an application 115, an operating system 120, and a file system module 130. Application 115 can include, for example, a word processing program, email program, graphic editing program, database application, server program, accounting software, spreadsheet tool, media consumption program, product development software, automatic update software, and the like. Application 115 accesses (e.g., by generating and/or consuming) data 162 in storage device 160. For example, application 115 is configured to initiate operations to write to and/or read from data 162. While FIG. 1 shows a single application 115, it is understood that multiple applications can be included in or coupled to computing device 110.

Operating system 120 controls the hardware of computing device 110 and provides various services to applications executing on computing device 110. Operating system 120 can facilitate interactions between application 115 and file system module 130.

File system module 130 is a special application that manages user data, which is maintained in a special data structure that is also referred to as a file system. File system module 130 maintains information regarding the user data, such as which blocks are allocated to which files, which files are included in which directories, and the like, in metadata 166. While shown as a stand-alone module in FIG. 1, file system module 130 can be included in operating system 120.

File system module 130 performs input/output (I/O) operations that access user data stored in data 162. Performing an I/O operation involves file system module 130 receiving a request (e.g., from application 115) to perform the I/O operation, performing the access specified in the request, and then signaling completion of the access to the requester.

File system module 130 includes a partition module 140 that is configured to partition directories. Partition module 140 can detect when a directory, should be partitioned and perform the steps to execute a partition of the directory. Partitioning the directory, or performing a partition operation on a directory, involves partition module 140 copying each entry in the directory to various partitions in a partitioned directory. In one embodiment, file system module 130 maintains a list in metadata 166 of all entries in the directory. Partition module 140 can start at the beginning of the list of entries and sequentially copy each entry identified by the list from the directory to the partitioned directory (not shown in FIG. 1).

File system module 130 also includes a parallel access module 145, which is configured to facilitate access to a directory while partition module 140 is partitioning the directory. As partition module 140 performs a partition operation on the directory, parallel access module 145 tracks the progress of the partition operation. In one embodiment, parallel access module 145 uses a transfer offset to track the progress of the partition operation. The transfer offset includes information that indicates a position in a list of entries in the directory being partitioned. When the partition operation begins, parallel access module 145 resets the transfer offset. As the partition operation proceeds, parallel access module 145 updates the value of the transfer offset. For example, parallel access module 145 can increment the transfer offset for each entry copied such that the transfer offset identifies the next entry to be copied in the partition operation. Parallel access module 145 can use the transfer offset to determine the position in the directory of entries that have already been copied to the partitioned directory as well as the position in the directory of entries that are yet to be copied.

As an example of the manner in which the system of FIG. 1 can perform the various functions described herein, consider a situation in which application 115 requests access to a directory while the directory is being partitioned by partition module 140. The access can include, for example, listing entries in the directory, looking up an entry in the directory, creating a new entry, deleting an existing entry, moving an entry from the directory to another directory, and the like. In response to the application's request, parallel access module 145 identifies one or more entries in the directory that correspond to data specified by the request.

Parallel access module 145 detects whether the requested operation is a read operation. If so, parallel access module 145 allows the read operation to proceed and file system module 130 reads the data from the directory and returns the data to the application that requested the data. On the other hand, if parallel access module 145 detects that the request is a request to modify data (either by changing, adding, or removing data) parallel access module 145 takes action to ensure that the consistency of the data is preserved without disrupting the ongoing partition operation.

In response to detecting a request to modify data in a directory that is being partitioned, parallel access module 145 determines the location of an entry the directory that correspond to the data using the transfer offset. If the entry is located before the transfer offset, the entry has already been copied to the partitioned directory. In this case, parallel access module 145 allows file system module 130 to modify the metadata, e.g., in metadata 166, and updates the entry in the original directory (e.g., the directory being partitioned), but also duplicates the modification so that the modification is also made to the partitioned directory. If the entry is located after the transfer offset, parallel access module 145 determines that the entry has not yet been copied to the partitioned directory. In this case, parallel access module 145 allows file system module 130 to modify the metadata, e.g., in metadata 166, updates the entry in the original directory, and does not make any modification in the partitioned directory. Parallel access module 145 does not make any modification in the partitioned directory since the entry has not yet been created in the partitioned directory and in any case the update will be captured when the entry is copied from the original directory to the partitioned directory. Updating an entry can involve modifying a filename, an inode listing, and/or inode associated with the entry.

Figure 2A:
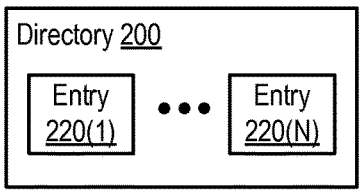
FIG. 2A is a block diagram of a directory, according to one embodiment of the present invention.

An example of how the system of FIG. 1 operates is described with regard to FIGS. 2A through 2E. FIGS. 2A through 2E illustrate various stages of a directory as the directory is partitioned. FIG. 2A shows a directory 200 at a first point in time prior to being partitioned. As shown in FIG. 2A, directory 200 includes entries 220(1) through 220(N). Each entry 220 includes metadata about a file in directory 200. In one embodiment, the metadata includes an inode associated with a file. Each entry 220 also includes a file name of the file. Directory 200 contains one or more entries 220 for each file included in directory 200.

It will be noted that the variable identifier "N" is used to more simply designate the final element of a series of related or similar elements (e.g., entries). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Figure 2B:
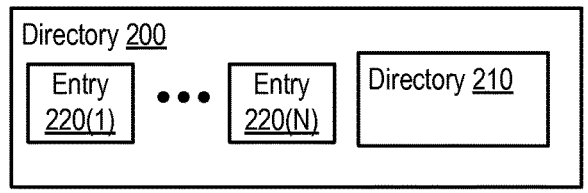
FIG. 2B is a block diagram of a directory, according to one embodiment of the present invention.

FIG. 2B shows directory 200 at a second point in time. A partitioning of directory 200 is ongoing at this second point in time. As shown in FIG. 2B, a second directory 210 has been created inside directory 200. In one embodiment, a partition module, such as partition module 140 of FIG. 1, creates directory 210. The partition module can also create directory 210 such that directory 210 is not included in directory 200, e.g., by including directory 210 in another directory. The partition module also creates a link between directory 210 and directory 200. In one embodiment, the link involves information included in an inode. The information includes a pointer that points to directory 200.

In one embodiment, the link is used to recover from a crash, e.g., in response to the file system detecting that the computing device crashed while a partition operation was ongoing. Recovering from a crash can involve using the link to identify the location of an incompletely partitioned directory so that the file system can remove the incompletely partitioned directory.

In one embodiment, directory 210 is implemented as a hidden file. Implementing directory 210 as a hidden file prevents the number of files in directory 200 from being incremented as a result of the addition of directory 210. Implementing directory 210 as a hidden file also prevents applications from detecting directory 210 and attempting to write files to, or otherwise update, directory 210.

Figure 2C:
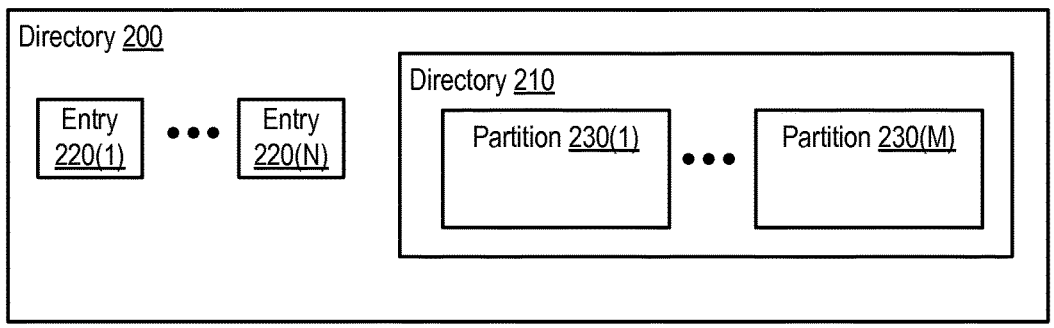
FIG. 2C is a block diagram of a directory, according to one embodiment of the present invention.

Subsequent to creating directory 210, the partition module creates partitions 230(1) through 230(M), as shown in FIG. 2C. In one embodiment, each partition is a sub-directory of directory 210. For each partition 230, the partition module creates an entry and adds the name of the entry to a listing of entries in the partitioned directory. The partition module creates an inode for the partition, links the inode to the partitioned directory, e.g., updates a pointer to point to the partitioned directory, and increments the link count of the partitioned directory to indicate that an additional inode has an interest in the partitioned directory. After the inode is created, the inode can be updated to include information about the partition, such as size, access mode, modification time, and information regarding files stored in the partition, such as the name of the files.

It will be noted that the variable identifier "M" is used to more simply designate the final element of a series of related or similar elements (e.g., entries). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Figure 2D:
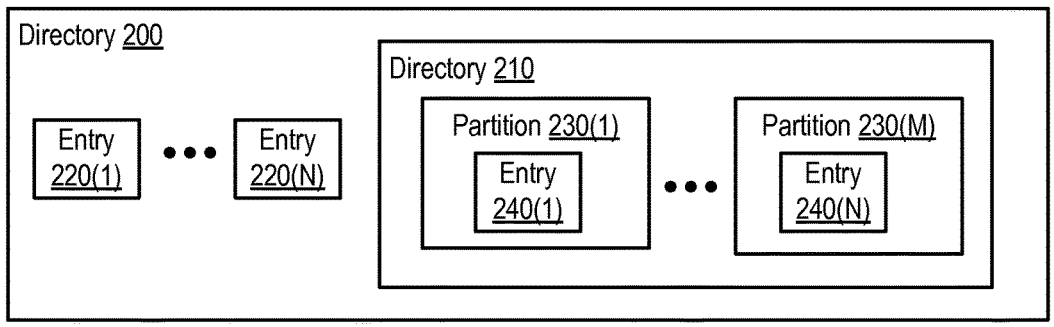
FIG. 2D is a block diagram of a directory, according to one embodiment of the present invention.
Figure 2E:
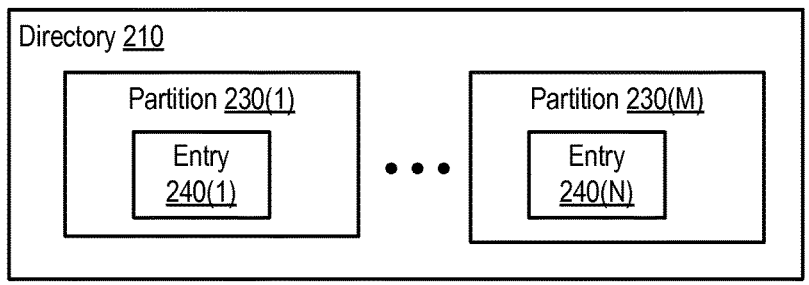
FIG. 2E is a block diagram of a directory, according to one embodiment of the present invention.

After creating the partitions, the partition module creates a copy of each entry 220 and stores the copy of the entry as an entry 240 in one of partitions 230, as shown in FIG. 2D. Upon completion of the partition operation, each partition 230 can include one or more of entries 240(1) through 240(N). The partition module selects which partition each entry is copied to using a selection and distribution algorithm. In one embodiment, the partition module selects which partition an entry is copied to based on a hash of the entry's file name. For example, if the partition module creates 128 partitions, the partition module can hash the file name associated with each entry. The hash generates an integer between 1 and 128. The partition module copies the entry to the partition that corresponds to the entries hash value, e.g., an entry whose file name hashes to the value one is copied to the first partition and an entry whose filename hashes to the value ten is copied to the tenth partition. It is noted that other mechanisms of distributing the copies of the entries among the partitions are compatible with the present disclosure. For example, a random distribution, a round-robin distribution, or any other method can be utilized. In one embodiment, the partition module can detect that the copies of the entries are not evenly distributed and redistribute the copies, e.g., move one or more copies of entries from one partition to another partition. After all entries 220 are copied to directory 210, the partition module removes the original directory 200, as illustrated in FIG. 2E.

Figure 3:
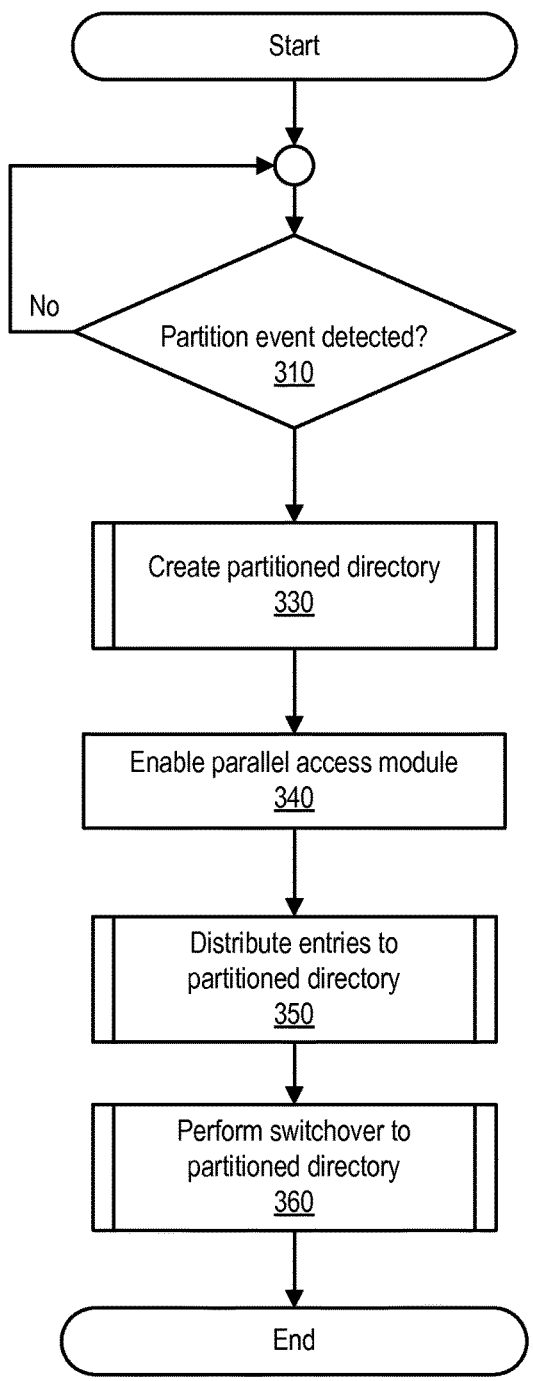
FIG. 3 is a flowchart of a method of partitioning a directory, according to one embodiment of the present invention.

FIG. 3 is a flowchart of a method of partitioning a directory without interrupting application I/O access to the directory. The directory that is partitioned is known as the original directory, and a newly created directory is known as the partitioned directory. In one embodiment, the method is performed by a partition module, such as partition module 140 of FIG. 1.

At 310, the partition module determines whether a partition event is detected. Various types of events can trigger a partition. Such partition events can include, for example, a request from a user, such as an administrator, to partition a directory. Alternatively, the partition module can automatically detect that a directory should be partitioned based on the occurrence of a pre-specified threshold condition, e.g., size of the directory exceeding a pre-specified value. Other examples of thresholds that can be used as a basis for partitioning a directory include, a number of files included in the directory, a number of entities, e.g., threads, that are attempting to access the directory in parallel, an access time for accessing the directory, a number of pending access requests for the directory, and the like. For example, the partition module can detect and keep a count of a number of pending update requests. The partition module can increment a counter that corresponds to the number pending update requests in response to detecting additional update requests and decrement the counter in response to detecting that an update has completed. The partition module can maintain a separate second counter to keep track of the pending number of access requests. The partition module increments the second counter that corresponds to the number pending access requests in response to detecting additional access requests and decrements the counter in response to detecting that an access has completed. Either or both of the counter values can be used as a basis for a partition operation. That is, the partition module can detect that the update counter is a first value and the access counter is a second value, and compare the value(s) with one or more thresholds. In response to the comparison, the partition module can initiate a partition operation. Another example of a trigger event is a frequency of update and/or access requests. That is, the partition module can detect that requests to update and/or access a directory are being received at a certain rate, or that a pre-specified number of requests are received in a pre-specified time period. In response to detecting the frequency is above a certain threshold, the partition module can initiate a partition operation.

These are merely examples, and it will be understood that other partition events can be specified, e.g., by an administrator, which, upon detection by the partition module, will trigger the partition module to partition the directory. Additionally, the threshold value for each of these events can be adjusted. For example, the partition module can be configured partition a directory in response to detecting that the directory includes 32 Kb of data at a first time, but then be configured to partition the directory in response to detecting that the size of the directory has reached 64 Kb of data. If no partition event is detected, the partition module does not partition a directory.

Figure 4:
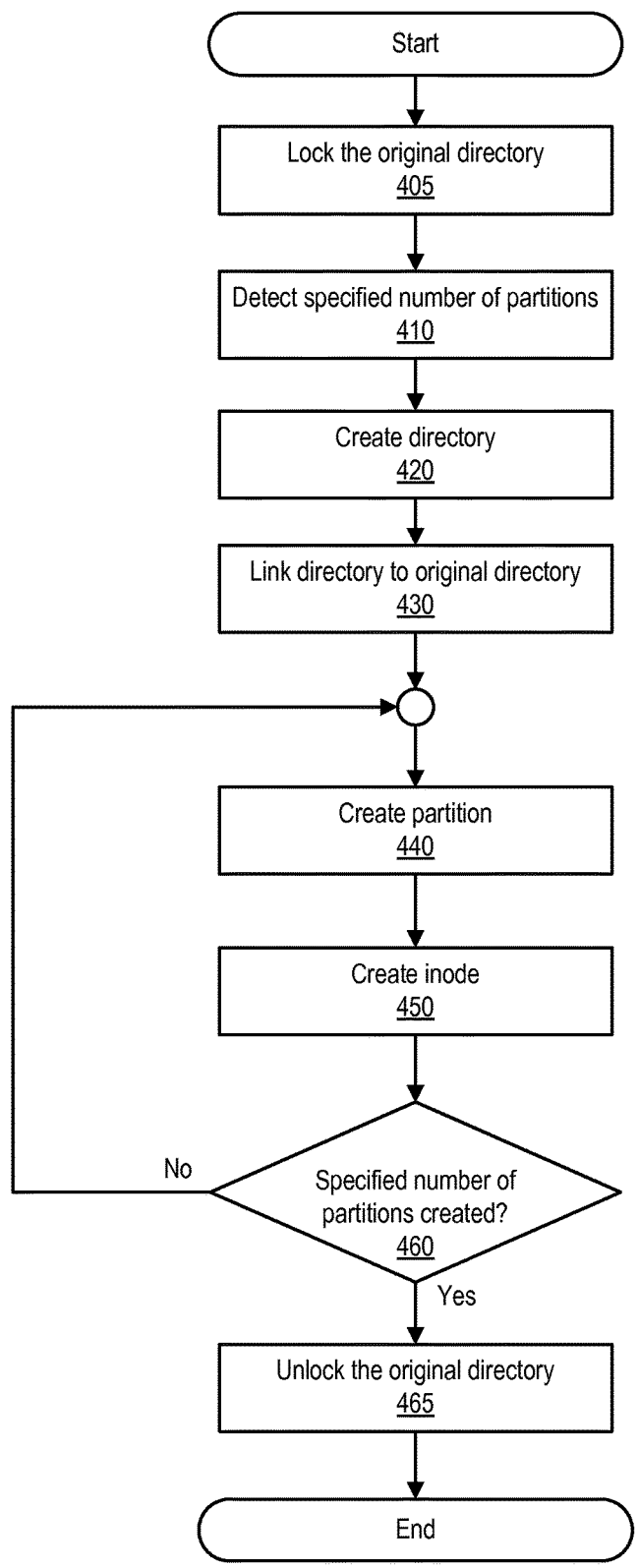
FIG. 4 is a flowchart showing additional details of a method of partitioning a directory related to creating a partitioned directory, according to one embodiment of the present invention.

In response to detecting a partition event at 310, the partition module creates a partitioned directory, as discussed in more detail with regard to FIG. 4. This involves creating a directory according to file system configuration parameters and updating metadata accordingly to indicate that the partitioned directory has been created. In one embodiment, updating the metadata includes creating an inode and linking the inode to an inode in the original directory.

The partition module enables a parallel access module, such as parallel access module 145 of FIG. 1, at 340. In one embodiment, enabling a parallel access module involves the partition module setting a flag indicating that a partition operation is ongoing. The parallel access module detects that the flag is set and begins operations to allow applications to continue to access the directory while the partition operation is ongoing. Alternatively, the parallel access module can automatically detect that a partition event has begun and begin processing I/O requests. The operations performed by the parallel access module are discussed in greater detail with regard to FIG. 7.

Figure 5:
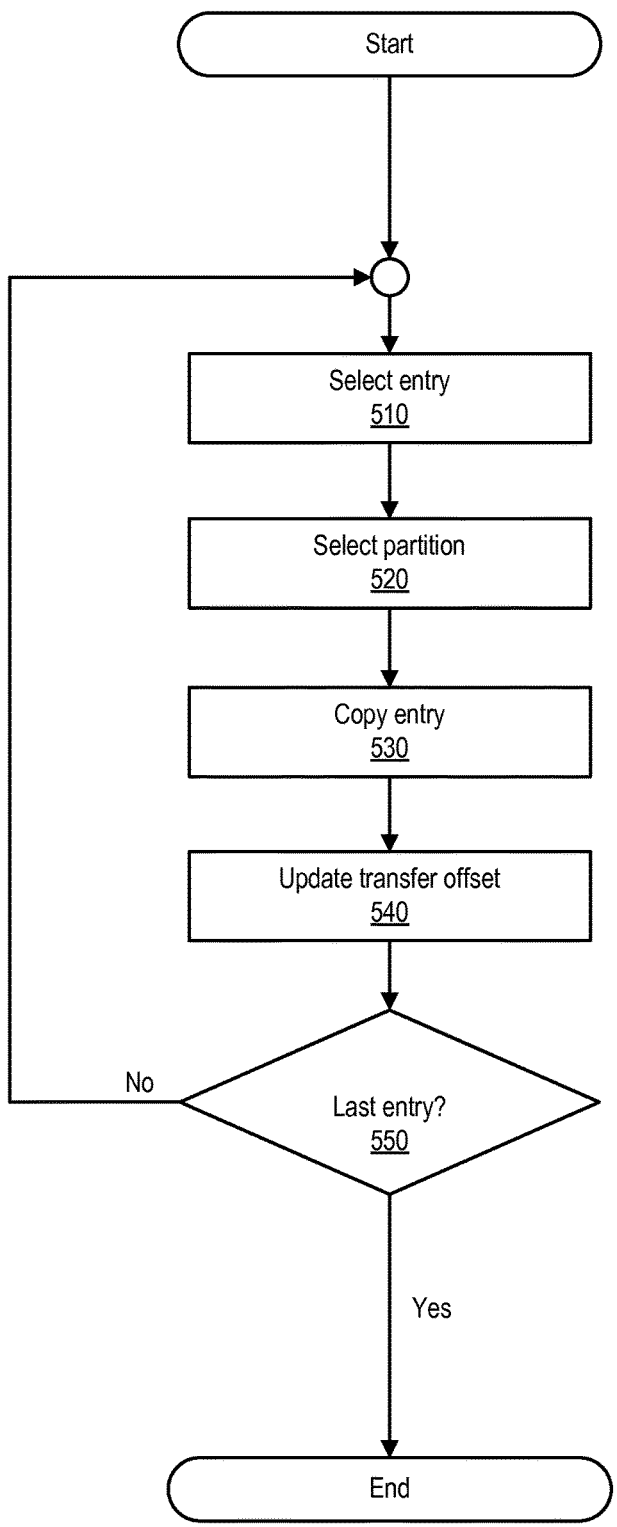
FIG. 5 is a flowchart showing additional details of a method of partitioning a directory related to distributing entries to the partitioned directory, according to one embodiment of the present invention.

As discussed in more detail with regard to FIG. 5, the partition module distributes the entries in the original directory to the partitioned directory at 350. Distributing the entries involves the partition module using a distribution algorithm, such as a hash function or round-robin function, for example.

Figure 6:
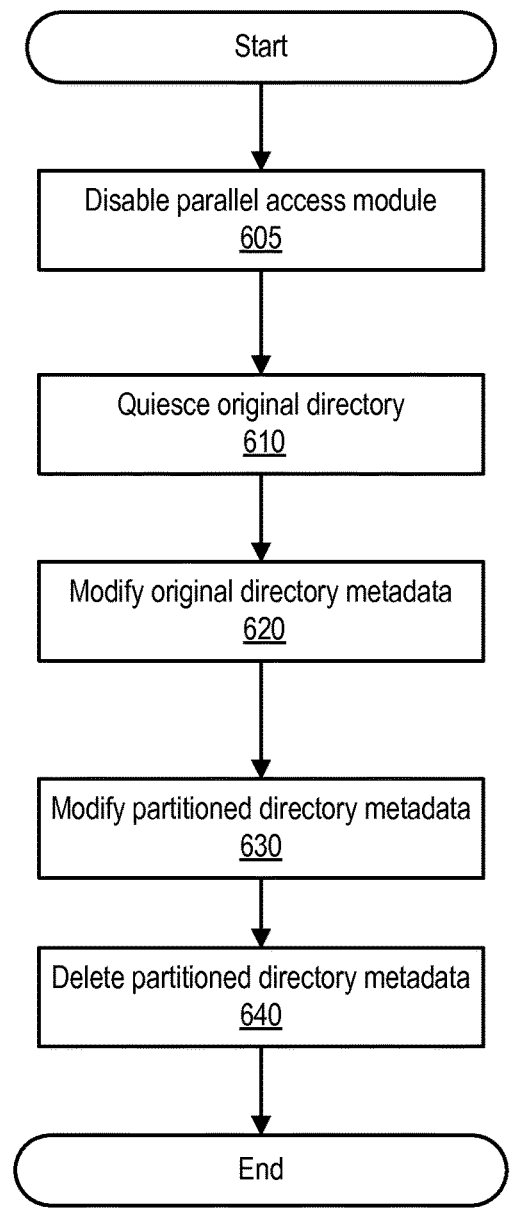
FIG. 6 is a flowchart showing additional details of a method of partitioning a directory related to switching from the original directory to the partitioned directory, according to one embodiment of the present invention.

As discussed in more detail with regard to FIG. 6, the file system switches over from the original directory to the partitioned directory at 360. Subsequent to switching over to the partitioned directory, all I/O operations that would previously have been directed to the original directory are directed to the various partitions of the partitioned directory.

FIG. 4 is a flowchart showing additional details of a method of partitioning a directory. Specifically, FIG. 4 shows a method for creating a partitioned directory. In one embodiment, the method is performed by a partition module, such as partition module 140 of FIG. 1.

At 405, the partition module locks the original directory, e.g., the directory that is being partitioned. In one embodiment, the partition module takes an exclusive lock on the original directory while the partitioned directory is being created and releases the exclusive lock after the partitioned directory is created. During the process in which the entries are being copied from the original directory to the partitioned directory, as discussed with regard to FIG. 5, the partition module does not lock the original directory and other entities are able to access and/or update the original directory.

At 410, the partition module detects a number of partitions that are to be included in the partitioned directory. A file system, such as file system module 130 of FIG. 1, can specify a default number of partitions, e.g., 128. Alternatively, a user (e.g., an administrator) can specify a number of partitions into which the partitioned directory is to be partitioned. Various other parameters can be specified at 410 for the partitioned disk, such as partition size, which can be specified in terms of number of blocks or number of bytes, for example.

At 420, the partition module creates the partitioned directory. The directory can be created inside the original directory. In one embodiment, the directory is a hidden file and creating the directory involves creating an inode associated with the directory known as a re-organization inode. Alternatively, the partition module can create partitions within the original directory and associate a flag with each partition. While the partitioning operation is ongoing, the flag for each partition can be set to indicate that the partition is not accessible to user applications. The partition module can clear the flags in response to detecting completion of the partition operation.

In the embodiment in which the partitioned directory is created as a hidden directory in the original directory, the partition module links the partitioned directory to the original directory at 430. In one embodiment, linking the partitioned directory to the original directory involves updating an inode, e.g., a pointer in the inode, in the partitioned directory to point to the original directory and updating a pointer in the original directory to point to the partitioned directory.

At 440, the partition module creates a partition in the partitioned directory. Creating the partition involves updating the re-organization inode to include information identifying the newly created partition. The partition module also creates an inode for the partition at 450. This inode will store information for files stored in the partition.

At 460, the partition module detects whether the partition module has completed creating all of the partitions, e.g., if the number of partitions created by the partition module matches the number of partitions specified in the configuration information. If not, the method returns to 440, and the partition module creates additional partitions until the number of created partitions matches the specified number.

The above embodiment describes creating a pre-specified number of partitions in a single sequential series of steps. In one embodiment, the partition module does not create the partitions all at once, prior to beginning copying of the entries from the original directory to the partitioned directory. Instead, the two processes can be interleaved. That is, the partitions can be created on an 'as-needed' basis. In this embodiment, the partition module initially creates the hidden directory, but does not create any additional partitions. Instead, the partition module waits to create a partition until an entry has been selected to be copied. In response to detecting that an entry is to be copied, the partition module can hash a name, e.g., a file name, associated with the entry. Based on the hash value, the partition module creates a corresponding partition.

At 465, the partition module releases the exclusive lock on the original directory.

FIG. 5 is a flowchart showing additional details of distributing entries from an original directory to a partitioned directory. In one embodiment, the method is performed by a partition module, such as partition module 140 of FIG. 1.

At 510, the partition module selects an entry in the original directory. In one embodiment, the partition module accesses a list of all entries included in the directory. The list can be maintained by a file system, such as file system module 130 of FIG. 1. The partition module starts with the first entry in the list of entries.

At 520, the partition module selects a partition. In one embodiment, the partition module generates a hash based on the name of the file associated with the selected entry. Based on the hash value, the entry is matched with one of the partitions in the partitioned directory. The partition module copies the entry to the selected partition at 530. The partition module also updates an inode associated with the partition to include information that indicates that the entry is included in the partition. In one embodiment, the partition module generates and maintains a list that includes information that identifies the entries that have been copied to the partitioned directory.

At 540, the partition module updates the transfer offset. In one embodiment, the transfer offset is implemented as a pointer to the list of entries stored in the original directory maintained by the file system. The partition module increments the pointer to point to the next entry in the list.

The partition module detects, at 550, whether more entries remain to be processed. If the pointer to the list is at the last entry of the list, no more entries remain to be copied from the original directory to the partitioned directory. Otherwise, if there are additional entries to be copied, the method returns to 510 and the partition module selects another entry.

FIG. 6 is a flowchart showing additional details of a method of performing a switchover. In one embodiment, the method is performed by a partition module, such as partition module 140 of FIG. 1.

The partition module disables the parallel access module at 605. The entries that have been copied to the partitioned directory will no longer be accessible via the original directory once the switchover is complete. Therefore, the parallel access module should not attempt to process any additional operations from the original directory. In one embodiment, disabling the parallel access module includes detecting that a flag indicates that the partition operation is no longer ongoing, e.g., detecting that a partition in progress flag is cleared.

At 610, the partition module queisces the directory. This ensures that no operations on the directory are ongoing during the switchover. At 620, the partition module modifies metadata associated with the original directory as part of completing the partition operation. This involves the partition module modifying the original directory to include information that identifies blocks that store metadata for the partitioned directory. In one embodiment, this involves updating an inode associated with the original directory. In particular, the pointers of the inode are updated to point to metadata associated with the partitioned directory.

The partition module modifies metadata associated with the partitioned directory at 630. This involves the partition module modifying the partitioned directory to include information that identifies blocks that store metadata for the original directory. In one embodiment, this involves updating an inode associated with the partitioned directory. In particular, the pointers of the inode are updated to point to metadata associated with the original directory. This helps ensure that the partitioning is transparent to the applications that use the files and that the applications can access their data through the partitioned directory. After the original directory and partitioned directory have been modified, the file system deletes the information that identifies the original directory's metadata, at 640. In one embodiment, this involves discarding the inode associated with the partitioned directory, e.g., the hidden file.

Figure 7:
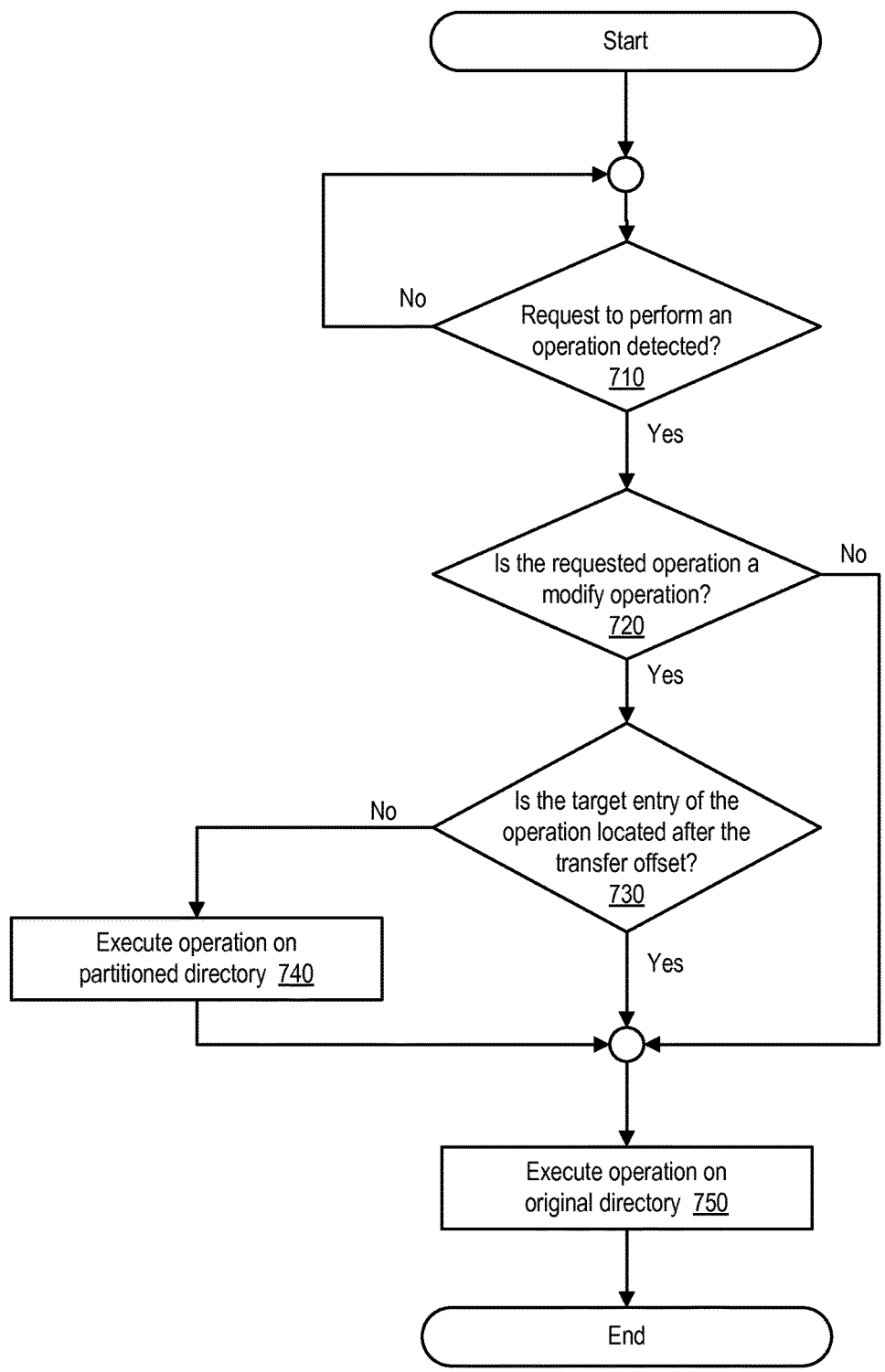
FIG. 7 is a flowchart of a method of processing operations while a partition operation is ongoing, according to one embodiment of the present invention.

FIG. 7 is a flowchart of a method of processing operations while a partition operation is ongoing in which an original directory is partitioned to form a partitioned directory. In one embodiment, the method is performed by a parallel access module, such as parallel access module 145 of FIG. 1.

At 710, the parallel access module determines whether a request to perform an operation, e.g., a request from an application such as application 115 of FIG. 1, is detected. If the parallel access module does not detect a request to perform an operation, the parallel access module takes no further action. Detecting a request to perform operation can involve intercepting an I/O instruction generated by a file system, such as file system module 130, in response to a request from an application.

In response to detecting a request to perform an operation, the parallel access module determines, at 720, whether the operation is a modify operation. The parallel access module decodes the intercepted I/O instruction to detect whether the instruction modifies data, e.g., modifies or deletes data stored in the original directory, or adds additional data to the original directory. If the operation is not a modify operation, e.g., the operation is an access operation, parallel access module allows the operation to proceed using the original directory without regard for whether the operation targets data before or after the transfer offset.

If the parallel access module detects that the requested operation modifies data stored in the original directory, the parallel access module detects, at 730, whether the operation targets an entry that is beyond the transfer offset. This involves determining which entry or entries the instruction implicates and also determining the value of the transfer offset. An entry that is to be updated is a target entry. If the target entry is before the transfer offset in the list of entries in the original directory, the parallel access module executes the operation on the partitioned directory at 740 along with executing the operation on the original directory. For example, the operation can indicate that a new file is to be created. The file system specifies that a new entry be created. The entry includes a file name and inode for the file. The file system also specifies a location for the new entry. If the file system specifies that the position at which the new entry is created is before the transfer offset's position in the list of entries included in the original directory, the parallel access module creates a copy of the new entry in the partitioned directory. This involves generating a hash associated with the new entry, assigning the new entry to a partition of the partitioned directory based on the hash, and updating metadata indicating that the new entry has been created, e.g., adding the new entry to a list of entries included in the partition directory.

Whether the entry is before or after the transfer offset, the parallel access module also executes the operation on the original directory at 750. That is, the parallel access module allows the instruction to modify the data specified by the operation and updates the target entry in the original directory, either by adding additional information to the target entry, removing information from the target entry, or creating a new entry in the original directory. This helps ensure that if the partition operation fails to complete, e.g., in response to a crash or other failure event, the original directory is current, with its entries updated accordingly.

Figure 8:
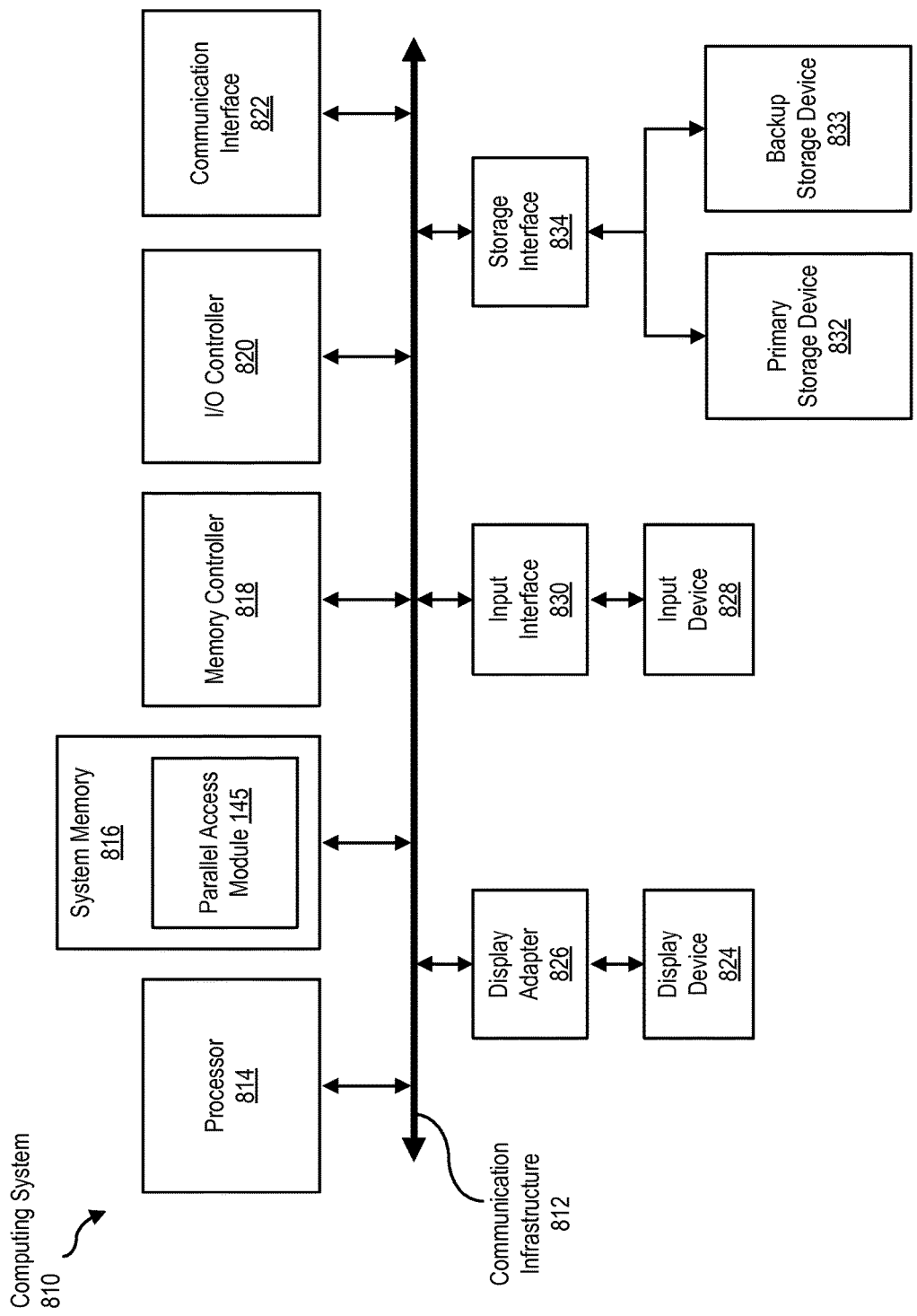
FIG. 8 is a block diagram of a computing device, illustrating how a partition module can be implemented in software, according to one embodiment of the present invention.

FIG. 8 is a block diagram of a computing system 810 capable of performing partition operations as described above. Computing system 810 broadly represents any single or multi-processor computing device or system capable of executing computer-readable instructions. Examples of computing system 810 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 810 may include at least one processor 814 and a system memory 816. By executing the software that implements a duplication module 134, computing system 810 becomes a special purpose computing device that is configured to perform partition operations in the manner described above.

Processor 814 generally represents any type or form of processing unit capable of processing data or interpreting and executing instructions. In certain embodiments, processor 814 may receive instructions from a software application or module. These instructions may cause processor 814 to perform the functions of one or more of the embodiments described and/or illustrated herein. For example, processor 814 may perform and/or be a means for performing the operations described herein. Processor 814 may also perform and/or be a means for performing any other operations, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 8102, as described in detail below). In one example, program instructions executable to implement a parallel access module 145 (e.g., as shown in FIG. 1) may be loaded into system memory 816.

In certain embodiments, computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the operations or features described and/or illustrated herein.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 8100, and storage interface 8104.

Communication interface 822 broadly represents any type or form of communication device or adapter capable of facilitating communication between computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer) for display on display device 824.

As illustrated in FIG. 8, computing system 810 may also include at least one input device 828 coupled to communication infrastructure 812 via an input interface 8100. Input device 828 generally represents any type or form of input device capable of providing input, either computer or human generated, to computing system 810. Examples of input device 828 include, without limitation, a keyboard, a pointing device, a speech recognition device, or any other input device.

As illustrated in FIG. 8, computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. A storage device like primary storage device 832 can store information such as deduplication signatures, backup images and/or a backup catalog.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be separate devices accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8.

Computing system 810 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 810 for storage in memory via a network such as the Internet or upon a carrier medium.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the embodiments described and/or illustrated herein. Additionally or alternatively, one or more of the embodiments described and/or illustrated herein may be implemented in firmware and/or hardware. For example, computing system 810 may be configured as an application specific integrated circuit (ASIC) adapted to implement one or more of the embodiments disclosed herein.

Figure 9:
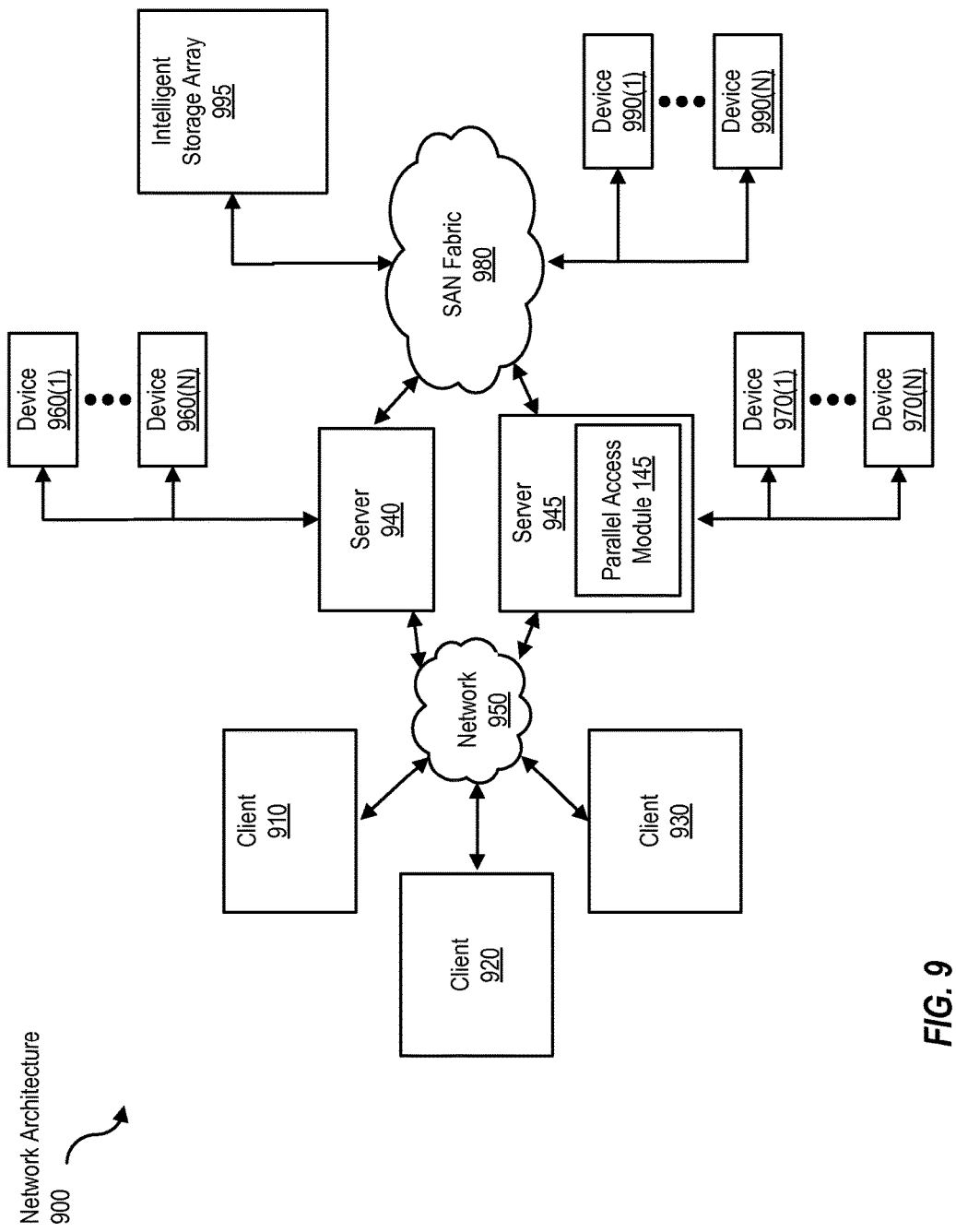
FIG. 9 is a block diagram of a networked system, illustrating how various computing devices can communicate via a network, according to one embodiment of the present invention.

FIG. 9 is a block diagram of a network architecture 900 in which client systems 910, 920, and 930 and servers 940 and 945 may be coupled to a network 950. Client systems 910, 920, and 930 generally represent any type or form of computing device or system, such as computing system 810 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, one or more of client systems 910, 920, and/or 930 may include a parallel access module 145 as shown in FIG. 1.

As illustrated in FIG. 9, one or more storage devices 940(1)-(N) may be directly attached to server 940. Similarly, one or more storage devices 970(1)-(N) may be directly attached to server 945. Storage devices 940(1)-(N) and storage devices 970(1)-(N) generally represent any type or form of storage device or medium capable of storing data and/or other computer-readable instructions. In certain embodiments, storage devices 940(1)-(N) and storage devices 970(1)-(N) may represent network-attached storage (NAS) devices configured to communicate with servers 940 and 945 using various protocols, such as Network File System (NFS), Server Message Block (SMB), or Common Internet File System (CIFS). Such storage devices can store deduplication signatures, backup images and/or backup catalogs, as described above.

Servers 940 and 945 may also be connected to a storage area network (SAN) fabric 980. SAN fabric 980 generally represents any type or form of computer network or architecture capable of facilitating communication between multiple storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 940(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 940(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 940, server 945, storage devices 940(1)-(N), storage devices 970(1)-(N), storage devices 990(1)-(N), intelligent storage array 995, or any combination thereof. All or a portion of one or more of the embodiments disclosed herein may also be encoded as a computer program, stored in server 940, run by server 945, and distributed to client systems 910, 920, and 930 over network 950.

In some examples, all or a portion of one of the systems in FIGS. 1, 8, and 9 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a duplication module may transform the behavior of a backup system such that backup image duplication operations can be scheduled to complete in a user-specified window.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request to partition a first directory of a file system, wherein
the request is received at a computing device coupled to a storage device,
at least a portion of the file system is stored in the storage device, and
the first directory comprises a plurality of entries;
creating a partitioned directory in response to the request, wherein
the creating the partitioned directory comprises updating metadata by creating an inode in the partitioned directory and linking the inode to an another inode in the first directory,
the partitioned directory comprises a plurality of partitions, and
the creating of the partitioned directory increases a number of points of access to the plurality of entries by virtue of the linking causing each partition of the plurality of partitions to comprise the metadata;
distributing one or more entries of the plurality of entries to a corresponding partition of the plurality of partitions, wherein
the distributing comprises
sequentially traversing a list of the plurality of the entries, and
for each entry of the one or more entries of the plurality of entries, creating a copy of the each entry of the one or more entries of the plurality of entries, and
storing the copy in the corresponding partition;
tracking a progress of the distributing using a transfer offset; and
based on a result of tracking the progress, performing an operation while the distributing is ongoing, wherein the operation comprises at least one of accessing the first directory, or updating the first directory.

2. The method of claim 1, wherein
the request is received in response to detecting a partition event, and
the detecting the partition event comprises at least one of
detecting that a size of the first directory has exceeded a pre-specified value,
detecting that a number of entries in the first directory has exceeded a pre-specified value, or
detecting an access characteristic of the first directory.

3. The method of claim 1, wherein
the distributing comprises calculating a hash value for the each entry of the one or more entries of the plurality of entries.

4. The method of claim 1, wherein the performing the operation comprises:
receiving an access request directed to a first entry in the first directory;
detecting whether a copy of the first entry has been created in the partitioned directory; and
in response to detecting that the copy of the first entry has been created in the partitioned directory,
modifying the first entry in the first directory, and
modifying the copy of the first entry in the partitioned directory.

5. The method of claim 4, wherein
the modifying the first entry comprises deleting the first entry, and
the modifying the copy of the first entry comprises deleting the copy of the first entry.

6. The method of claim 1, further comprising:
updating a transfer offset in response to the creating the copy.

7. The method of claim 1, wherein
the operation further comprises
adding a Previously Presented entry to the first directory.

8. The method of claim 1, further comprising:
quiescing the first directory prior to the performing a swap operation, wherein
the swap operation comprises deleting the first directory.

9. A non-transitory computer readable storage medium storing program instructions executable to:
receive a request to partition a first directory of a file system, wherein
the request is received at a computing device coupled to a storage device, and
at least a portion of the file system is stored in the storage device, and
the first directory comprises a plurality of entries;
create a partitioned directory in response to receiving the request, wherein
the creating the partitioned directory comprises updating metadata by creating an inode in the partitioned directory and linking the inode to an another inode in the first directory,
the partitioned directory comprises a plurality of partitions, and
the creating the partitioned directory increases a number of points of access to the plurality of entries by virtue of the linking causing the partitioned directory comprising a plurality of partitions to comprise the metadata;
distribute one or more entries of the plurality of entries to a corresponding partition of the plurality of partitions, wherein
the distributing comprises
sequentially traversing a list of the plurality of entries, and
for each entry of the one or more entries of the plurality of entries,
creating a copy of the each entry of the one or more entries of the plurality of entries, and
storing the copy in the partitioned directory;
track a progress of the distributing using a transfer offset; and
based on a result of tracking the progress, facilitate performance of an operation while distribution of the entries is ongoing, wherein
the operation comprises at least one of accessing the first directory, or updating the first directory.

10. The non-transitory computer readable storage medium of claim 9, wherein
the request is received in response to detecting a partition event, and
the detecting the partition event comprises at least one of
detecting that a size of the first directory has exceeded a pre-specified value,
detecting that a number of entries in the first directory has exceeded a pre-specified value, or
detecting an access characteristic of the first directory.

11. The non-transitory computer readable storage medium of claim 9, wherein
distributing the entries comprises calculating a hash value for the each entry of the one or more entries of the plurality of entries.

12. The non-transitory computer readable storage medium of claim 9, wherein the program instructions are further executable to:
receive an access request directed to a first entry in the first directory;
detect whether a copy of the first entry has been created in the partitioned directory; and
in response to detecting that the copy of the first entry has been created in the partitioned directory,
modify the first entry in the first directory, and
modify the copy of the first entry in the partitioned directory.

13. The non-transitory computer readable storage medium of claim 12, wherein
modifying the first entry comprises deleting the first entry, and
modifying the copy of the first entry comprises deleting the copy of the first entry.

14. The non-transitory computer readable storage medium of claim 9, wherein the program instructions are further executable to:
update a transfer offset in response to creation of the copy.

15. The non-transitory computer readable storage medium of claim 9, wherein the program instructions are further executable to:
add a previously presented entry to the first directory.

16. A computing system comprising:
one or more processors;
a storage device, coupled to the one or more processors; and
a non-transitory computer-readable medium coupled to the one or more processors, wherein program instructions, executable by the one or more processors, are stored in the non-transitory computer-readable medium and are configured to cause the one or more processors to
receive a request to partition a first directory of a file system, wherein
the request is received at a computing device coupled to a storage device, and
at least a portion of the file system is stored in the storage device, and
the first directory comprises a plurality of entries;
create a partitioned directory in response to receiving the request, wherein
the creating the partitioned directory comprises updating metadata by creating an inode in the partitioned directory and linking the inode to an another inode in the first directory,
the partitioned directory comprises a plurality of partitions, and
the creating the partitioned directory increases a number of points of access to the plurality of entries by virtue of the linking causing the partitioned directory comprising a plurality of partitions to comprise the metadata;
distribute one or more entries of the plurality of entries to a corresponding partition of the plurality of partitions, wherein
the distributing comprises
sequentially traversing a list of the plurality of entries, and
for each entry of the one or more entries of the plurality of entries,
creating a copy of the each entry of the one or more entries of the plurality of entries, and
storing the copy in the partitioned directory;
track a progress of the distributing using a transfer offset; and
based on a result of tracking the progress, facilitate performance of an operation while distribution of the entries is ongoing, wherein
the operation comprises at least one of accessing the first directory, or updating the first directory.

17. The computing system of claim 16, wherein
the request is received in response to detecting a partition event, and
the detecting the partition event comprises at least one of
detecting that a size of the first directory has exceeded a pre-specified value,
detecting that a number of entries in the first directory has exceeded a pre-specified value, or
detecting an access characteristic of the first directory.

18. The computing system of claim 16, wherein
distributing the entries comprises calculating a hash value for the each entry of the one or more entries of the plurality of entries.

19. The computing system of claim 16, wherein the program instructions are further executable to:
receive an access request directed to a first entry in the first directory;
detect whether a copy of the first entry has been created in the partitioned directory; and
in response to detecting that the copy of the first entry has been created in the partitioned directory,
modify the first entry in the first directory, and
modify the copy of the first entry in the partitioned directory.

20. The computing system of claim 19, wherein
modifying the first entry comprises deleting the first entry, and
modifying the copy of the first entry comprises deleting the copy of the first entry.

21. The computing system of claim 16, wherein the program instructions are further executable to: delete the first directory, wherein
the partitioned directory is created inside the first directory,
the plurality of entries are stored in the storage device, and
the partitioning does not change an amount of storage space in the storage device that is consumed by the plurality of entries by virtue of the partitioning facilitating access to data through the partitioned directory.

22. The method of claim 1, further comprising:
determining a location of a target entry associated with the operation;
comparing the location with the transfer offset; and
executing the operation on the partitioned directory in response to the determining indicating that the location is before the transfer offset.

23. The method of claim 1, wherein
data stored in the file system is stored in the storage device, and
the partitioning does not change an amount of storage space in the storage device that is consumed by the data by virtue of the partitioning facilitating access to the data through the partitioned directory.

24. The method of claim 1, wherein
the transfer offset comprises information that indicates a position of the one or more entries in a list of entries in the first directory, and
the updating the metadata indicates that the partitioned directory has been created.

25. The method of claim 1, wherein
the updating the metadata further comprises: updating the one or more entries in the first directory, and duplicating one or more modifications caused by the updating the metadata in the partitioned directory.

* * * * *